United States Patent
De Jesus

(10) Patent No.: US 11,489,851 B2
(45) Date of Patent: Nov. 1, 2022

(54) METHODS AND SYSTEMS FOR MONITORING CYBER-EVENTS

(71) Applicant: Cyber Defence QCD Corporation, Ottawa (CA)

(72) Inventor: Tiago Alves De Jesus, Ottawa (CA)

(73) Assignee: Cyber Defence QCD Corporation, Ottawa (CA)

( * ) Notice: Subject to any disclaimer, the term of this patent is extended or adjusted under 35 U.S.C. 154(b) by 269 days.

(21) Appl. No.: 16/758,363

(22) PCT Filed: Nov. 5, 2018

(86) PCT No.: PCT/CA2018/051394
§ 371 (c)(1),
(2) Date: Apr. 22, 2020

(87) PCT Pub. No.: WO2019/084693
PCT Pub. Date: May 9, 2019

(65) Prior Publication Data
US 2020/0344248 A1    Oct. 29, 2020

Related U.S. Application Data

(60) Provisional application No. 62/581,805, filed on Nov. 6, 2017.

(51) Int. Cl.
*H04L 9/40*    (2022.01)
(52) U.S. Cl.
CPC ...... *H04L 63/1416* (2013.01); *H04L 63/1425* (2013.01)

(58) Field of Classification Search
CPC ............ H04L 63/1416; H04L 63/1425; G06F 21/552
USPC .......................................................... 726/24
See application file for complete search history.

(56) References Cited

U.S. PATENT DOCUMENTS

| | | | | |
|---|---|---|---|---|
| 6,609,205 B1 * | 8/2003 | Bernhard | ................ | H04L 43/00 726/22 |
| 7,464,407 B2 * | 12/2008 | Nakae | ................ | H04L 63/1408 713/188 |
| 8,193,929 B1 * | 6/2012 | Siu | ...................... | H04L 12/2829 340/870.01 |
| 8,779,921 B1 * | 7/2014 | Curtiss | ................ | G08B 25/009 340/541 |
| 8,793,790 B2 * | 7/2014 | Khurana | ............. | H04L 63/1441 726/1 |
| 9,112,895 B1 * | 8/2015 | Lin | ...................... | H04L 63/1425 |
| 9,306,965 B1 * | 4/2016 | Grossman | ........... | H04L 63/1425 |

(Continued)

*Primary Examiner* — Badri Narayanan Champakesan
*Assistant Examiner* — Badri Champakesan
(74) *Attorney, Agent, or Firm* — DLA Piper LLP (US)

(57) ABSTRACT

The present invention provides a method of monitoring a computer network, the method comprising: providing a plurality of sensors, wherein said sensors form a meshed network of sensors which monitor cyber-event(s); detecting, by the plurality of sensors, cyber-event(s); linking cyber-event(s) to subsequent cyber-event(s) into branches to form/extend a cyber-event tree; comparing said cyber-event tree to a baseline cyber-event tree; determining if there is any differences in said cyber-event tree to said baseline cyber-event tree to identify a cyber-event tree or a branch thereof as anomalous and thereby identify potential anomalous event(s) and/or a cyber-attack.

5 Claims, 4 Drawing Sheets

(56) References Cited

U.S. PATENT DOCUMENTS

| | | | |
|---|---|---|---|
| 9,367,683 B2* | 6/2016 | Kolacinski | G06F 21/55 |
| 9,852,232 B2 | 12/2017 | Anderson et al. | |
| 10,902,062 B1* | 1/2021 | Guha | H04L 41/16 |
| 2007/0209074 A1* | 9/2007 | Coffman | G06F 21/552 |
| | | | 709/224 |
| 2015/0074806 A1* | 3/2015 | Roundy | H04L 63/1425 |
| | | | 726/23 |
| 2015/0134601 A1* | 5/2015 | Anderson | G06F 16/24578 |
| | | | 707/748 |
| 2016/0205122 A1* | 7/2016 | Bassett | G06F 21/577 |
| | | | 726/23 |
| 2017/0063887 A1* | 3/2017 | Muddu | G06F 3/04842 |
| 2017/0336061 A1* | 11/2017 | Riedel | H05B 47/19 |

* cited by examiner

Cross-Network Communications

METHODS AND SYSTEMS FOR MONITORING CYBER-EVENTS

CROSS-REFERENCE TO RELATED APPLICATIONS

This application is a 35 USC § 371 National Stage application of International Application No. PCT/CA2018/051394 filed Nov. 5, 2018, which claims the benefit under 35 USC § 119(e) to U.S. Application Ser. No. 62/581,805 filed Nov. 6, 2017. The disclosure of each of the prior applications is considered part of and is incorporated by reference in the disclosure of this application.

FIELD OF THE INVENTION

The present invention pertains to the field of network security. In particular, the present invention provides systems and methods for detecting anomalous cyber-events.

BACKGROUND OF THE INVENTION

Cyber-security events, including external cyber-attacks and internal security breaches are a major concern for both organizations and individuals which can result in significant damages. Immediate damages may include but are not limited to data deletion and/or corruption, data theft, release of confidential information to the public, and/or system/network downtime. Subsequent damages may include but are not limited to financial losses, social and/or political repercussion, business interruption, loss of competitive advantage and/or loss of intellectual property.

The frequency and complexity of cyber-attacks have increased over time and the nature of such attacks is continuously evolving. Current cyber-security technologies are insufficient to address the growing challenge of cyber-security. In particular, many cyber-security technologies only detect and/or prevent a single step, phase and/or aspect of possible cyber-attacks. Given the complexity and continued evolution of cyber-attacks, the detection and/or prevention of a single step, phase and/or aspect of a cyber-attack may be insufficient to detect and/or prevent cyber-attacks.

Anti-virus (AV) technologies focus on detecting cyber-attacks through the analysis of executable binaries and files written to the target's file system. The insertion of a malicious file on a device is only one potential step in a cyber-attack and is not required to carry out a successful cyber attack.

Whitelisting technologies prevent non-authorized binaries and scripts from executing on a target node. This is effective at preventing malicious binaries and scripts from effectively executing a cyber attack. However, the utilization of binaries and scripts in a cyber attack is not required.

Network Intrusion Detection System (NIDS) technologies focus on detecting cyber attacks through the identification of "malicious" Internet Protocol (IP) packets crossing the network. This detection strategy is limited to only one aspect of a cyber-attack: communications between agents and the attacker's command and control infrastructure. It provides no visibility into any other aspect of the cyber-attack such as the persistence and privilege escalation mechanisms, among others.

Perimeter Firewalls can be used as a cyber security technology to detect and/or prevent assets from connecting and/or communicating with specified IP and/or domain addresses using specific ports. This technology only focuses on detecting and/or preventing the command and control communication step in a cyber attack.

Internal Firewalls can be used as a cyber security technology to detect and/or prevent assets from connecting and/or communicating with other internal assets from specific IP and/or domain addresses over specified ports, which might have been deemed as suspicious. This only focuses on detecting and/or preventing the lateral movement phase in cyber attack tree.

Web Proxies technologies focus on the detection of cyber attacks through the inspection and analysis of web traffic, including encrypted traffic. The determination that a communication is "suspicious" is most often based on cyber threat intelligence, typically provided by third party. This approach to detecting cyber attacks requires that the attacker uses web-based command and control communication channels. Once again it only focused on one potential aspect of a complete cyber-attack tree.

Sandbox technologies focus on the first phase of a cyber attack, where the threat attempts to gain a foothold on the target. The sandbox tries to determine if an e-mail or web-traffic is malicious by attempting to "detonate" it in the hope to get its payload to executed. Many threats can bypass this security measure using multiple strategies, such as requiring specific user interactions before triggering payload execution.

In addition, current technologies may capture a limited number of possible cyber-attack pathways.

End-point security technologies have limited visibility into cyber-attack trees as they do not monitor the Windows Registry or Windows Management Instrumentation (WMI) repository for realtime cyber-attack pathway events.

Network Level Security technologies have no visibility into node level events, which makes them blind to a large number of cyber-attack pathways events, such as persistence, privilege escalation, credential harvesting and token stealing, among others.

Security Information and Event Management (SIEM) can collect a large number of events across a spectrum of security technologies as well as native Windows event logs. While a much larger number of cyber-attack pathway events can be captured, both at the node and network level, many events still escape detections.

Accordingly, there is a need in the art for a cyber-security system and method that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide methods and systems for monitoring cyber-events. In accordance with an aspect of the present invention, there is provided a method of monitoring a computer network, said method comprising: providing a plurality of sensors, wherein said sensors form a meshed network of sensors which monitor cyber-event(s); detecting, by the plurality of sensors, cyber-event(s); linking cyber-event(s) to subsequent cyber-event(s) into branches to form/extend a cyber-event tree; comparing said cyber-event tree to a baseline cyber-event tree; determining if there is any differences in said cyber-event tree to said baseline cyber-event tree to identify a cyber-event tree or a branch thereof as anomalous and thereby identify potential anomalous event(s) and/or a cyber-attack.

In another aspect of the present invention, there is provided a method of monitoring a computer network, said method comprising: providing a plurality of sensors, wherein said sensors form a meshed network of sensors which monitor cyber-event(s); detecting, by the plurality of sensors, cyber-event(s); linking cyber-event(s) to subsequent cyber-event(s) into branches to form/extend a cyber-event tree; and scoring probability that said cyber-event tree or a branch thereof is anomalous.

DETAILED DESCRIPTION OF THE INVENTION

Definitions

Figure 1:
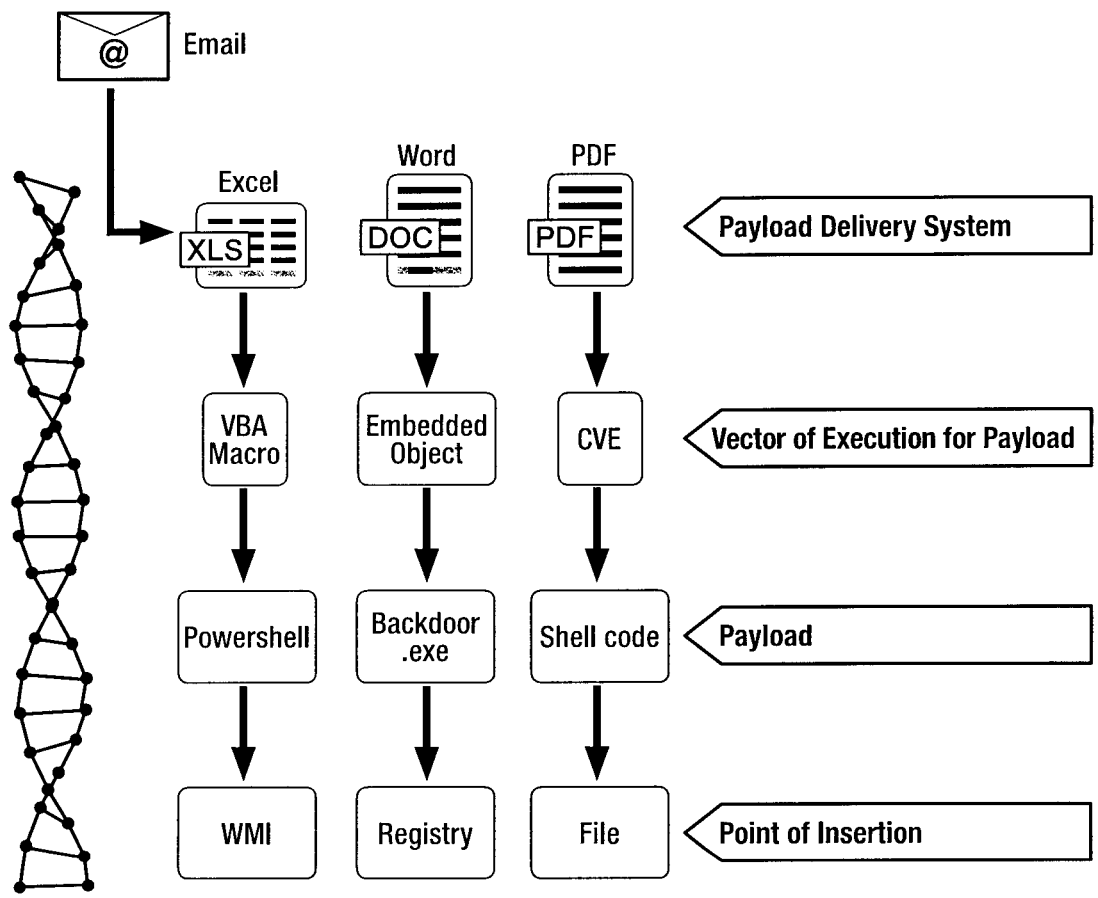
FIG. 1 illustrates potential cyber-attack pathways.

Unless defined otherwise, all technical and scientific terms used herein have the same meaning as commonly understood by one of ordinary skill in the art to which this invention belongs.

Cyber-event trees, as used herein, are chained sequences of cyber-event branches, which originate from a unique point of origin. Cyber-event branches are composed of chained sequence of individual cyber-events. Cyber-events may include but are not limited to cyber-events ranging from the change to a registry key to the execution of a program. Illustrative non-limiting examples using simplified representation of a cyber-event branch are as follows:
1. E-Mail⇒attached document⇒Word starts up⇒VBA script is launched⇒cmd.exe is launched⇒powershell is launched⇒connection to web site;
2. Web-traffic⇒file creation⇒process creation⇒TCP connection⇒grey listed geo-location;
3. Autostart location⇒process creation⇒DNS traffic⇒txt record⇒registry key modification;
4. E-mail⇒creation of zip archive⇒process execution⇒creation of scheduled task⇒execution of scheduled task⇒web-traffic to grey listed domain.

Cyber Attack Pathways, as used herein, are various individual cyber-events that are known and can be used by an adversary to compromise a network and perform a full cyber operation against a target. For example, certain native Windows tools such as cmd.exe, powershell.exe, and wsctipt.exe may be used to perform a cyber attack. Similarly, certain registry keys and file system folders are often used by adversary to circumvent detection and/or gain a persistence presence on the target.

Meshed network, as used herein, is a network of sensors and/or agents that are aware of both local "nearest-neighbour" [NN] sensors and/or agents, through which is can relay information to a "central authority" [CA], as well as the location of various dedicated relay points to the central authority. A meshed network is said to be self-healing if its sensors and/or agents are monitored by both nearest-neighbour sensors and/or agents as well as the central authority through its relays such that when a sensor or agent becomes non-responsive the sensor is automatically restarted or re-installed, depending on the circumstances, by either its nearest-neighbour or the central authority.

The present invention provides systems and methods of monitoring cyber-events. In certain embodiments, the systems and methods of the present invention may be used to monitor for anomalous cyber-events including but not limited to cyber-attacks, system crash and application crash. Cyber-events may be at the individual node level as well as the network level.

Non-limiting examples of potential cyber-attack pathways which may be monitored using the systems and methods of the present invention include but is not limited to: the modification of a registry key to enable the automatic execution of a payload upon user logon; creation of a new registry key to "hide" a malicious payload; creation of a new Windows Management Instrumentation (WMI) class with a malicious method; network web-traffic with an unusual user-agent going out to a "grey listed" list geo-location; internal network traffic between end nodes using the RPC protocol; remote modification of an end node's registry key value; remote modification of an end node's WMI repository; creation of new file type extension on an end node; modification of a registry to enable privilege escalation through the abuse of a Window's software installation feature; creation of a new dynamic link library on an end node's hard drive; creation of a new executable file on a common network share; remote non-interactive Windows logon; remote creation and running of a new service; local creation of a new user account; modification local user account access right; modification of the sethc executable; and inter-node RDP connection.

The present invention provides systems and methods of detecting anomalous cyber-events by scoring cyber-event trees or branches thereof. This scoring may be continuous, periodic or in response to a command. In certain embodiments, scoring probability that a cyber-event tree or a branch thereof is anomalous based on the conditional probability that the last added cyber-event to the event tree is normal or anomalous, a comparison with a baseline/established cyber-event tree, internal/external sources of information and/or cyber intelligence.

The steps of the method of the present invention may comprise:

a. Providing a plurality of sensors and/or agents.

The sensors and/or agents form a meshed network which monitors-cyber-events. In certain embodiments, the meshed network is self-healing. The sensors and/or agents may be deployed at the host/node and/or network level. In certain embodiments, the sensors are native operating system.

Exemplary embodiments of the meshed networks of the present invention are described with reference to FIG. 2 to FIG. 6.

Figure 2:
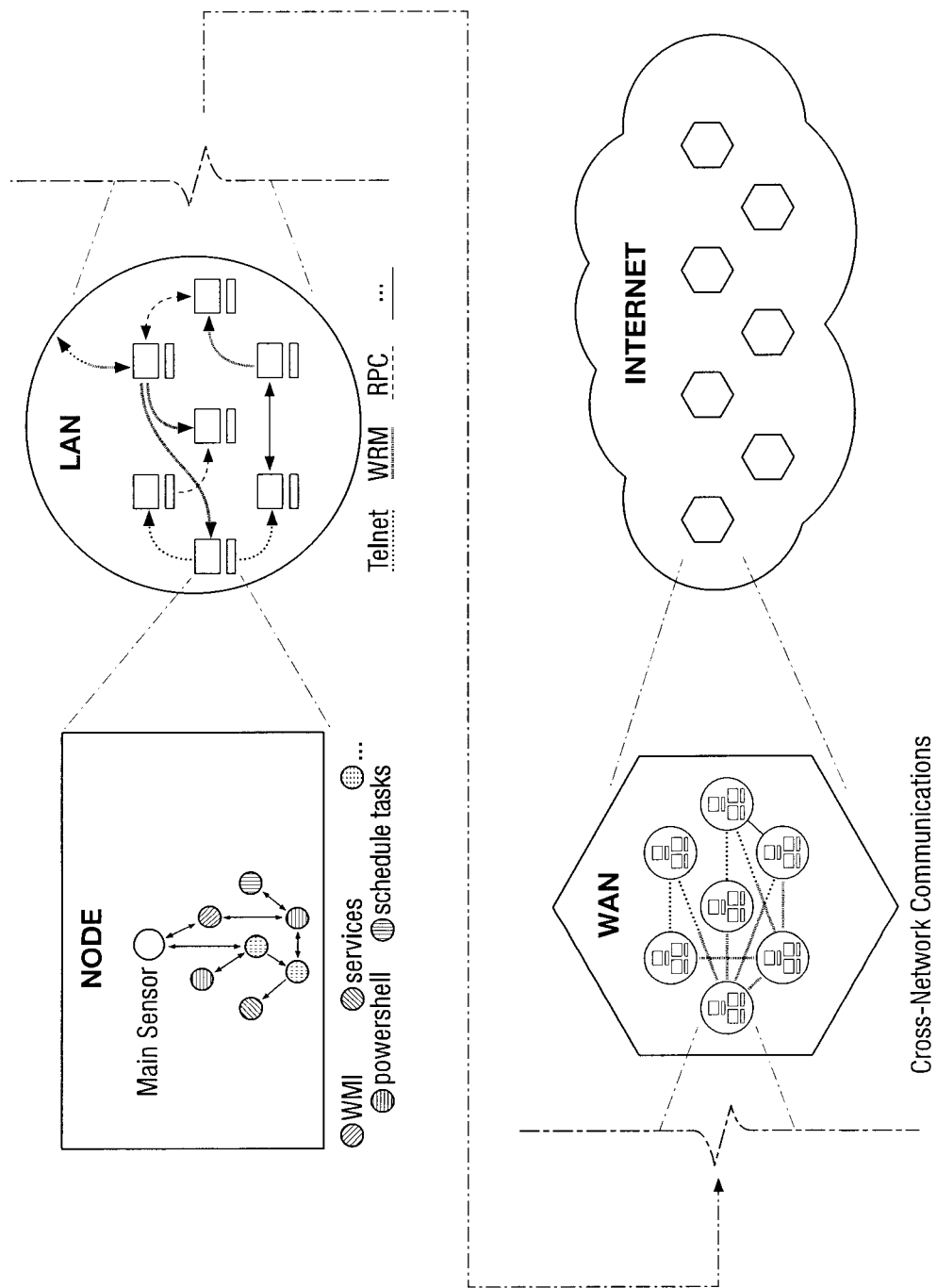
FIG. 2 illustrates one embodiment of a global meshed network.

FIG. 2 illustrates a non-limiting example of a global multi-scaled meshed network of node based sensors distributed across different logical, physical and geographical locations. The "meshing" between each sensor may occur on each of the scales in the global meshed network. The 'meshing' is implemented by ensuring that the sensors, both the main node sensor as well as the 'watch' sensors, are continually performing push and pull requests between each other, both randomly and in a deterministic fashion, to ensure that each sensor is always alive. Each sensor may verify both direct and/or indirect through an intermediary sensor(s), that another sensor is alive using one or multiple possible methods, each one of the methods are provided publicly or privately by the sensor to be watched. If any sensor fails the "Is Alive?" test then the requesting node may start the self-healing process, which may be implement in multiple ways including but not limited to the execution of "on node" instructions for healing, importing healing instructions from other sensors on another node in the same LAN or from a distant LAN accessible through the WAN or directly from the management nodes at the Internet level. Each occurrence of a failed sensors, that is a sensor that fails the "is alive" test and all healing requests are logged, and the logs are sent to the management nodes through one or multiple possible communication channels.

Figure 3:
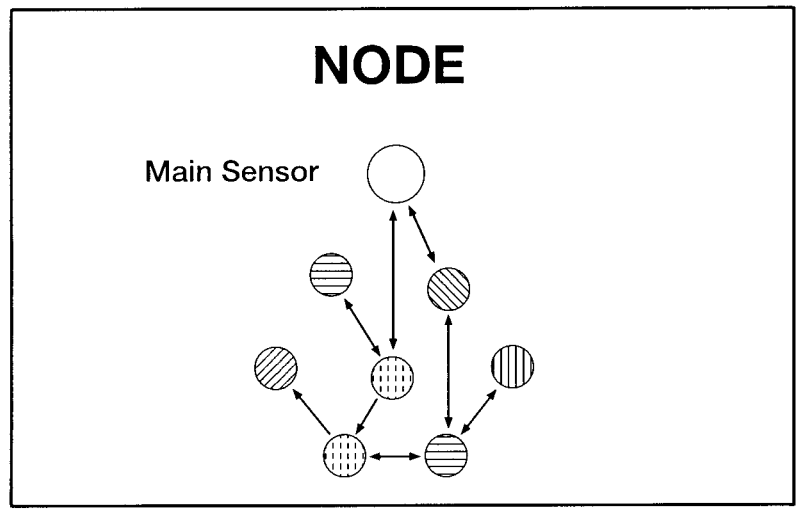
FIG. 3 illustrates one embodiment of an on node meshed network.

FIG. 3 illustrates a non-limiting example of an on node meshed network. At the smallest scale, the node level, which includes but is not limited to smartphones, servers, workstations, laptops, and tablets, a meshed network of sensors continually watch to see if the main sensors and/or one or more of the 'watcher sensors' are alive or not. This continual verification that all sensors, both the main and watch sensors, are alive, and the capability to heal any sensor, causes all of the "on node" sensors to be bound together into one single mesh at the node level. This meshing can be implemented using the following technologies include but are not limited to Windows Management Instrumentation (WMI), Windows Registry, Services, Scheduled tasks, Cron jobs, bash, python, ruby, cmd, powershell, and VBS, among others. All sensors are built from a mixture of native Operating System capabilities and/or external tools, such as but not limited to imported executable files, modules, libraries and functions, among others.

Figure 4:
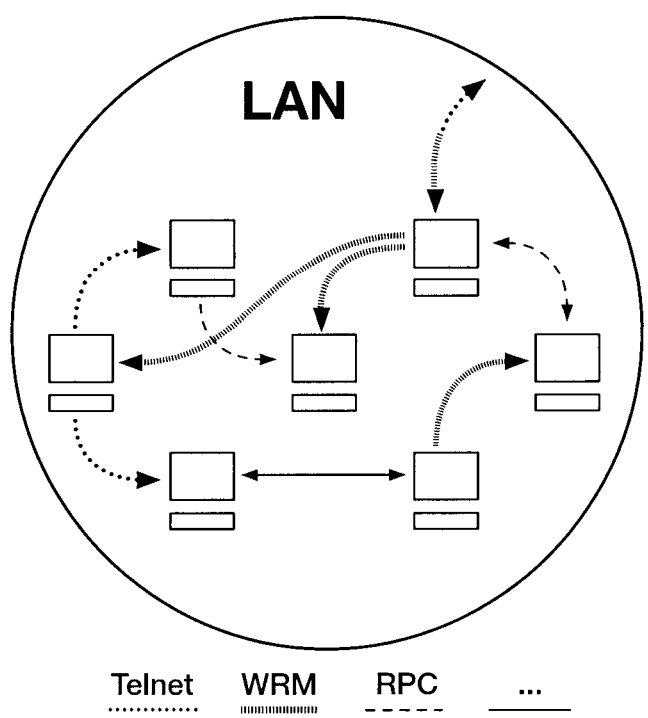
FIG. 4 illustrates one embodiment of a meshed sensor network at the LAN level.

FIG. 4 illustrates a non-limiting example of a meshed sensor network at the LAN level. At the Local Area Network (LAN) level, all of the "on node" sensors join together to form a single unique LAN mesh. All of the sensors on each node can check the "Is Alive" status of any other nodes in the LAN, both directly and/or indirectly through an intermediate sensor(s), using one of many techniques, at random and/or deterministic times. Each sensor can also implement healing methods for sensors on any other nodes using one of multiple techniques both directly or indirectly. This LAN meshing can be implemented using technologies such as but are not limited to Window Remote Management (WinRM), Remote Procedural Call (RPC), Telnet and Virtual Network Computing (VNC), among others. These and other inter node communication channels can be used to request "is Alive" status for sensors on other nodes in the LAN. The requests can be both push and pull driven.

Figure 5:
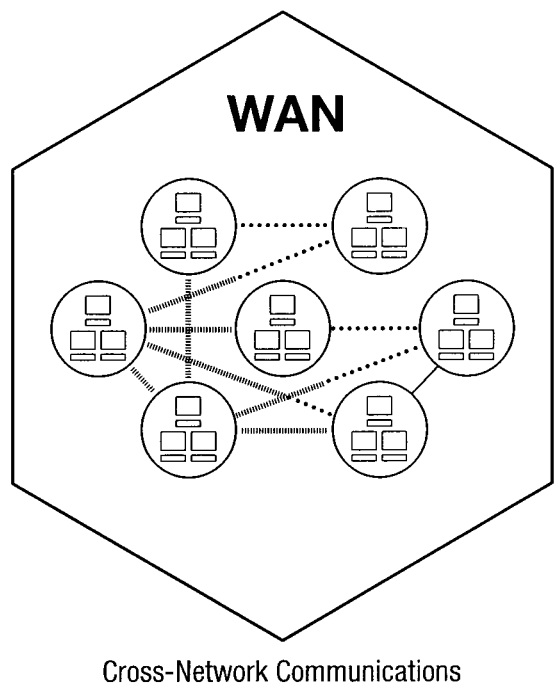
FIG. 5 illustrates one embodiment of a meshed sensor network at the WAN level.

FIG. 5 illustrates a non-limiting example of a meshed sensor network at the WAN level. At the Wide Area Network level the meshing occurs through 'connector' nodes, that is nodes in one LAN that has an open communication channel(s) with one or multiple nodes in another LAN. These connector nodes are used to bind the meshing of one LAN to the meshing of another LAN, creating one unique mesh that crosses LAN boundaries in the WAN. This process can be repeated across all the LAN in all the WAN until a unique bounded meshed is created, if possible, such that the failure of one of the sensors, i.e. is alive is false, on one nodes in one LAN in a specific WAN can be detected by another sensors on any other node on any LAN contained in any WAN, either directly or indirectly through one or multiple intermediate nodes. Each pathway between connector nodes are the key elements that bind the LAN meshing at these different levels. This WAN meshing can be implement using, once again, technologies such as but are not limited to Window Remote Management (WinRM), Remote Procedural Call (RPC), Telnet and Virtual Network Computing (VNC), among others. These and other inter node communication channels can be used to request "is Alive" status for sensors on other nodes in other LANs. The requests can be both push and pull driven.

Figure 6:
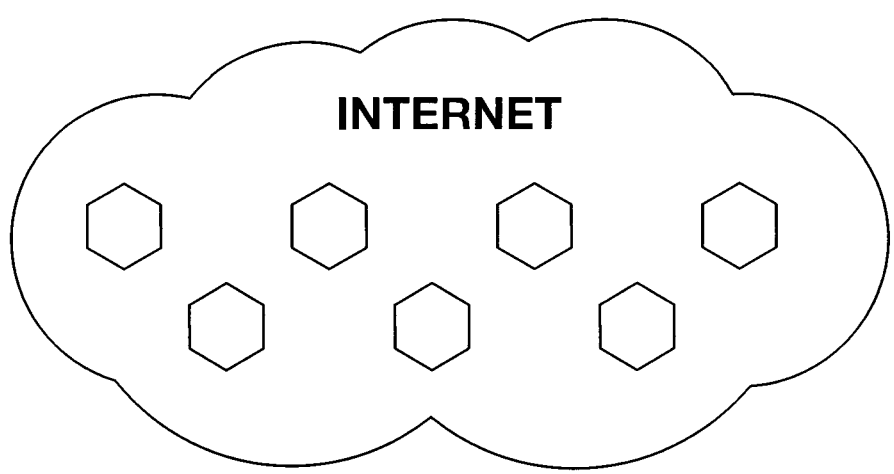
FIG. 6 illustrates one embodiment of a meshed sensor network at the internet level.

FIG. 6 illustrates a non-limiting example of a meshed sensor network at the internet level. One problem with WAN meshing is that different WANs might not be connected directly together, and thus cannot be bound together into on unique mesh because there are no direct pathways connecting the WANs. To complete the meshing internet level management nodes that act as "node connectors" between the various WANs are introduced in order to create one unique global meshed network. These internet level management nodes can complete the meshing using technologies such as but are not limited to TCP/IP, UDP, FTP, P2P, and SSH among others. The Internet level nodes also play the role of log collector to track the failures and healing of sensors across the global meshed network.

Visibility/sensitivity of the network may be increased by deploying new sensors and/or agents and/or increasing the sensitivity of existing sensors and/or agents. For example, when a network is actively under attack by an adversary the cyber defence team may wish to increase the visibility/sensitivity of the monitoring system by deploying additional sensors or increasing the sensitivity of existing sensors to report back a greater level of information.

The agents and/or sensors relay information to a Central Authority. In certain embodiments information is relayed through nearest neighbour nodes and/or relay nodes to the central authority. In specific embodiments information is relayed in a cryptographically secure manner. In certain embodiments, in order to minimize software installation requirements, native operating system (for example Windows) capabilities may be utilized to sensor the network.

In specific embodiments, there is provided a meshed network of self-healing sensors at the node level that can execute command(s) obtained from a chained ledger of cryptographically tagged and secure code blocks, which cryptographically identifies and validates the originator of the command(s) and requested sensor(s) to perform them.

In certain embodiments, the network utilizes dynamic sentinals to enable semi-automated or manual interaction with end-point node(s) through direct secure cryptographically authenticated communication channels in view of having an cyber defence operator perform investigative or mitigative response activities.

b. Detecting, by the plurality of sensors and/or agents, cyber-event(s).

The cyber-events detected may be events at the node level including at individual end-nodes and/or the network level. Exemplary, non-limiting cyber-events include: changes to the Windows Registry; changes to the Windows File System; changes to the Windows Management Instrumentation (WMI) Repository; changes to the process space; changes to network connection; and network traffic.

In certain embodiments, monitoring is real-time monitoring. In specific embodiments, all cyber-events, including all user actions are monitored. In other embodiments, a portion of cyber-events are monitored. The level of monitoring may evolve or be adjusted. For example, when a network is actively under attack the level of monitoring may be increased.

c. Linking cyber-event(s) to subsequent cyber-event(s) into branches to form/extend a cyber-event tree.

By monitoring and analysing cyber-events, cyber-events may be linked together into cyber-event branches, which may then be organized into a cyber-event tree. Non-limiting examples of cyber-event branches include: parent to child process startup event; process to TCP connection event; e-mail attachment to file creation event; VBA macro execution to web-traffic event; powershell execution to registry key modification event; and web-traffic to "grey listed" IP addresses connection event. Non-limiting examples of cyber-event trees include: e-mail⇒file creation⇒VBA macro execution⇒web-traffic⇒grey listed IP address; web-traffic⇒file creation⇒process creation⇒TCP connection⇒grey listed geo-location; autostart location ⇒process creation⇒DNS traffic⇒txt record⇒registry key modification; and e-mail⇒creation of zip archive⇒process execution⇒creation of scheduled task⇒execution of scheduled task⇒web-traffic to grey listed domain.

In certain embodiments, probabilistic modelling may be used to link cyber-events.

d. Scoring probability that said cyber-event tree or a branch thereof is anomalous.

Scoring the probability that a cyber-event tree or a branch thereof is anomalous may be based on the conditional probability that the last added cyber-event to the event tree is normal or anomalous (i.e. context; i.e. the probability that the branch is anomalous is based on the previously calculated probabilities along with the likelihood that the latest cyber-event has been correctly connected to the right cyber-event tree), a comparison with a baseline cyber-event tree, internal/external sources of information and/or cyber intelligence.

The following is provided as an illustrative example only of an analysis which may occur upon receipt of an email: An email is received and the email's source and destination, along with its header metadata, are analyzed and scored. The creation of a file from the downloading of the attachment is once again scored based the file type and its content and also scored with respect to the context that this file was sent from the specified sender. The historical context of "Has this sender sent in the past such files attachments to the receiver?" is taken into account in the calculation of the conditional probability. In this specific situation it can be confirmed with 100% probability that the created file on the hard drive comes from the email's attachment because it can be confirmed cryptographically that the two files are identical. In the next step of the attack, the user opens the file, which is soon followed by the creation of a new process.

While confirmation that the events are connected with perfect certainty might not be possible at the technical level, a probability that they are connect may be made. The probability that this latest process is malicious or not is computed as a conditional probability of all other previously events on the branch. The new process establishes a TCP connection to a grey listed domain. At this time, it is possible to establish with perfect certainty that the two events are 100% related event. Then all that remains is computing the probability that this latest event is malicious or not based on the conditional probability that of this event happening considering all the previous event have previously occurred. At this point the probability that the cyber-event tree is malicious or not should be converging towards ether extreme of the probability spectrum. This is a general behaviour as the number of events being branched together grows the probability quickly tends to converge to either 0 or 1.

In certain embodiments, the cyber-event tree being analyzed is compared to a baseline cyber-event tree to identify the cyber-event tree or a branch thereof as anomalous and therefore identify potential anomalous event(s) and/or a cyber-attack. Non-limiting exemplary anomalous cyber-event trees which may be identified through a comparison with a baseline cyber-event tree includes but are not limited to: a new autostart process tree branch suddenly appears under a user's profile; existing process tree branch established TCP connection to an external IP address that has never been observed before; existing process tree branch establishes WinRM session with neighbour node, which has never been observer before; and existing listening service receives packets event from network node, which has never been observed before.

In certain embodiments, statistical models including but not limited to machine learning (ML) algorithms are utilized to score likelihood that an cyber-event tree is normal or anomalous through direct scoring and classification as normal or anomalous (e.g. cyber-attack; system crash; and/or application crash). Scoring may be continuous, periodic or in response to user input. In certain embodiments, scoring a cyber-event tree as a cyber-attack tree may be based on one or more of the following parameters: cyber-intelligence [ e.g. Indicators of Compromise [IOCs] such as file hashes, domain names, IP addresses etc.); external information based on investigation [ e.g. review content of twitter posts/websites viewed by end user; known cyber-attack pathways; and time, environment and context specific historical data. Parameters may change over time.

In certain embodiments, cyber-event trees are organized into three groups based on scoring: blacklist (i.e. known bad); whitelist (i.e. known good) and greylist (i.e. unknown). Greylisted cyber-events trees may be continuously monitored and subject to additional checks, inquiries and investigation until the tree can be whitelisted or blacklisted. Whitelisted cyber-event trees may be greylisted or blacklisted with the addition of new cyber-events to the cyber-event tree. For example, when an adversary migrates their malicious process into a legitimate one such as explorer.exe or excel.exe. Cyber-event tree status may be revoked and re-determined to correct for false positive and false negatives. In certain embodiments, the scoring of the full cyber-event tree is repeated with the addition of a new cyber-event (i.e. new scoring of a cyber-event tree may be independent of historical scoring for the cyber-event tree).

The baseline cyber-event tree may be time dependent (e.g. a baseline cyber-event tree may evolve over time because of changes to the operating system including patches and updates); environment specific (e.g., different devices such as workstations and mobile devices may have different baseline cyber-event trees); and/or context aware (e.g. a baseline cyber-event tree may be reflect user behaviours. As an illustrative example, the expected cyber-activities of an user in the HR department will be different to the expected cyber-activities of an user in the IT department and as such the baseline cyber-event trees of such users will be different)
.

Accordingly, in certain embodiments, baseline cyber-event trees are uniquely generated for each individual cyber asset.

In certain embodiments, baseline cyber-event trees evolves over time. In specific embodiments, this evolution may be in order to capture user context specific behavioural changes that are legitimate. For example, a baseline fingerprint will be created for all normal startup process tree hierarchies, for each individual node. This cyber-event tree will start with the process startup mechanism event, continuing on with the generation of process creation event branches, and will also include any inter-nodal and external communications event branches. This cyber-event tree may evolve in response to legitimate modifications to the OS and/or applications/programs resulting from updates, hot-fixes and patches. Once the baseline fingerprints are established they can be used to identify potential anomalous events and/or malicious cyber-attack trees.

In certain embodiments, an automated investigative response may be trigged by the evolution of cyber-event trees such that additional information and cyber intelligence from both internal and external sources is dynamically gathered to improve the Algorithmic Scoring and AI Classification (i.e. reduce error);

In certain embodiments, the method initiates countermeasures against any identified cyber-attacks. In specific embodiments, an automated active response that utilizes pre-authorized client approved measures to mitigate possible on-going cyber-attacks is triggered by context specific conditions.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the incention in which an exclusive property or privilege is claimed are defined as follows:

1. A method of detecting anomalous cyber-events and/or cyber-attack, said method comprising:
providing a plurality of sensors, wherein said sensors form a meshed network of sensors which monitor cyber-event(s), wherein each sensor of said plurality of sensors in said meshed network is monitored by nearest-neighbour sensors and a central authority through its relays such that when a sensor is non-responsive the sensor is automatically restarted or re-installed by the nearest-neighbour sensors or the central authority;
detecting, by the plurality of sensors, cyber-event(s);
linking detected cyber-event(s) to subsequently detected related cyber-event(s) to form/extend a cyber-event tree;
comparing said cyber-event tree to a baseline cyber-event tree of normal cyber-events; and
in response to determination that a difference exists between said cyber-event tree to and said baseline cyber-event tree, to identifying said cyber-event tree or a branch thereof as anomalous and thereby identify potential anomalous event(s) and/or a cyber-attack.

2. The method of claim 1, wherein said baseline cyber-event tree evolves over time.

3. The method of claim 2, where evolution of the baseline cyber-event tree is in response to user context specific behaviour changes, legitimate modifications to the operating system and/or applications.

4. The method of claim 1, wherein said sensors are built from native operating system capabilities and/or external tools.

5. The method of claim 1, wherein probabilistic modeling of the cyber-event tree or a branch thereof identifies the potential anomalous event(s) and/or a cyber-attack.

\* \* \* \* \*